(12) United States Patent
Septien Prieto

(10) Patent No.: US 9,713,320 B2
(45) Date of Patent: Jul. 25, 2017

(54) POULTRY FEEDER

(71) Applicant: Francisco Javier Septien Prieto, Guanajuato (MX)

(72) Inventor: Francisco Javier Septien Prieto, Guanajuato (MX)

( * ) Notice: Subject to any disclaimer, the term of this patent is extended or adjusted under 35 U.S.C. 154(b) by 63 days.

(21) Appl. No.: 14/404,211

(22) PCT Filed: Aug. 4, 2014

(86) PCT No.: PCT/MX2014/000122
§ 371 (c)(1),
(2) Date: Nov. 26, 2014

(87) PCT Pub. No.: WO2016/018136
PCT Pub. Date: Feb. 4, 2016

(65) Prior Publication Data
US 2016/0021853 A1    Jan. 28, 2016

(30) Foreign Application Priority Data
Jul. 28, 2014   (MX) .................... MX/a/2014/009122

(51) Int. Cl.
*A01K 39/012*   (2006.01)
(52) U.S. Cl.
CPC ............................... *A01K 39/0125* (2013.01)
(58) Field of Classification Search
CPC .... A01K 39/00; A01K 39/012; A01K 39/014; A01K 39/02; A01K 39/04; A01K 39/06; A01K 39/0125
See application file for complete search history.

(56) References Cited

U.S. PATENT DOCUMENTS 4,527,513 A * 7/1985 Hart ..................... A01K 39/04
                                                        119/51.5
5,007,380 A * 4/1991 Badia ................ A01K 39/0125
                                                        119/53
(Continued)

FOREIGN PATENT DOCUMENTS

WO    WO 2015175940 A1 * 11/2015 ......... A01K 39/0125

*Primary Examiner* — Joshua Huson
(74) *Attorney, Agent, or Firm* — Hoglund & Pamias, PSC; Roberto J. Rios

(57) ABSTRACT

A poultry feeder for feeding birds in their early stages of growth, having a rectangular-rounded shape, comprising: a clamp for embracing a food supply tube; a holding throat for holding the clamp; a shutter for limiting the food supply; a hopper coupled to the holding throat for distributing the food; a food receiving plate integrally coupled to said hopper; wherein the holding throat is bifurcated and surrounds the clamp; wherein the hopper extends from the holding throat; wherein the clamp, which has a cylindrical shape, comprises three sections: a left lateral section; a central section and a right lateral section, and is formed by an upper half and a lower half, wherein said upper and lower halves are symmetrical and semi-cylindrical; wherein the upper half of the clamp comprises: an upper left lateral section, an upper central section and an upper right lateral section; and the lower half of the clamp comprises a lower left lateral section; lower central section, and a lower right lateral section; wherein the central section having a width and a diameter which are greater than a width and a diameter of the lateral sections; and wherein the central section is delimited by two central flanges, and the left and right lateral sections comprising an end flange respectively, wherein the central flanges having a diameter which is larger than the diameter of the end flanges, wherein the central flanges comprising a protrusion or security stop which has the (Continued)

function of limiting the rotation of the feeder, and wherein the end flange only extends in the upper right lateral section.

13 Claims, 7 Drawing Sheets

(56) References Cited

U.S. PATENT DOCUMENTS

| | | | | |
|---|---|---|---|---|
| 5,097,797 A * | 3/1992 | Van Zee | ............ | A01K 39/0125 119/57.4 |
| 5,462,017 A * | 10/1995 | Pollock | .............. | A01K 39/0125 119/53 |
| 5,642,688 A * | 7/1997 | Bannier | ............. | A01K 39/0125 119/53 |
| 5,762,021 A * | 6/1998 | Horwood | ........... | A01K 39/0125 119/52.1 |
| 5,927,232 A * | 7/1999 | Pollock | .............. | A01K 39/0125 119/53 |
| 6,532,895 B1 * | 3/2003 | Andersen | ........... | A01K 39/0125 119/57.4 |
| 6,779,488 B2 * | 8/2004 | Corti | .................. | A01K 39/0125 119/52.4 |
| 6,860,230 B2 * | 3/2005 | Momont | ............ | A01K 39/0213 119/72.5 |
| 7,100,533 B2 * | 9/2006 | Cole | .................. | A01K 39/0125 119/52.4 |
| 7,107,932 B2 * | 9/2006 | Cole | .................. | A01K 39/0125 119/51.01 |
| 7,162,973 B2 * | 1/2007 | Cole | .................. | A01K 39/0125 119/52.4 |
| D542,981 S * | 5/2007 | Cole | ........................... | D30/124 |
| 7,228,817 B2 * | 6/2007 | Busse | .............. | A01K 39/0125 119/52.1 |
| 7,552,697 B2 * | 6/2009 | Busse | .................... | A01K 39/01 119/52.1 |
| 7,647,888 B2 * | 1/2010 | Slankard | ............ | A01K 39/0125 119/52.4 |
| 8,033,248 B2 * | 10/2011 | Cole | .................. | A01K 39/0125 119/52.1 |
| 8,347,816 B2 * | 1/2013 | Keirse | ................. | A01K 39/012 119/52.1 |
| 8,381,683 B2 * | 2/2013 | Keirse | ................. | A01K 39/0125 119/52.4 |
| D701,654 S * | 3/2014 | Septien Prieto | ............. | D30/121 |
| D786,511 S * | 5/2017 | Septien Prieto | ............. | D30/121 |
| 2002/0152965 A1 * | 10/2002 | Turner | ............... | A01K 39/0125 119/53 |
| 2003/0056730 A1 * | 3/2003 | Corti | .................. | A01K 39/0125 119/53 |
| 2004/0244705 A1 * | 12/2004 | Momont | ............ | A01K 39/0213 119/72.5 |
| 2005/0066906 A1 * | 3/2005 | Cole | .................. | A01K 39/0125 119/52.4 |
| 2005/0072365 A1 * | 4/2005 | Busses | ............... | A01K 39/0125 119/57.7 |
| 2006/0196434 A1 * | 9/2006 | Cole | .................. | A01K 39/0125 119/52.4 |
| 2007/0186863 A1 * | 8/2007 | Cole | .................. | A01K 39/0125 119/61.1 |
| 2007/0215056 A1 * | 9/2007 | Kreger | ............... | A01K 39/0213 119/72.5 |
| 2008/0202437 A1 * | 8/2008 | Garware | ............ | A01K 39/0125 119/57.4 |
| 2008/0257270 A1 * | 10/2008 | Slankard | ............ | A01K 39/0125 119/53 |
| 2009/0000555 A1 * | 1/2009 | Keirse | ................. | A01K 39/0125 119/52.1 |
| 2009/0320763 A1 * | 12/2009 | Cole | .................. | A01K 39/0125 119/53 |
| 2010/0192863 A1 * | 8/2010 | Van de Ven | ......... | A01K 39/014 119/52.1 |
| 2011/0094447 A1 * | 4/2011 | Keirse | ................. | A01K 39/012 119/52.1 |
| 2011/0107972 A1 * | 5/2011 | Keirse | ................. | A01K 39/0125 119/51.01 |
| 2012/0199077 A1 * | 8/2012 | Cottam | .............. | A01K 39/0125 119/52.1 |
| 2013/0036976 A1 * | 2/2013 | Pickens | .............. | A01K 39/0125 119/51.01 |
| 2013/0139755 A1 * | 6/2013 | Steudler, Jr. | .......... | A01K 39/012 119/51.01 |
| 2013/0139758 A1 * | 6/2013 | Steudler, Jr. | ........ | A01K 39/0125 119/53 |

* cited by examiner

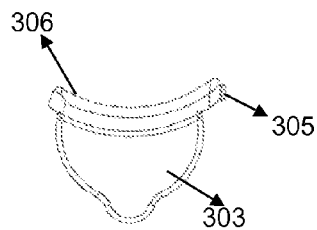
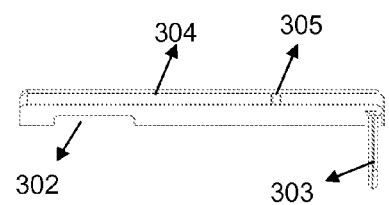
FIG. 22　　　　　　　FIG. 23
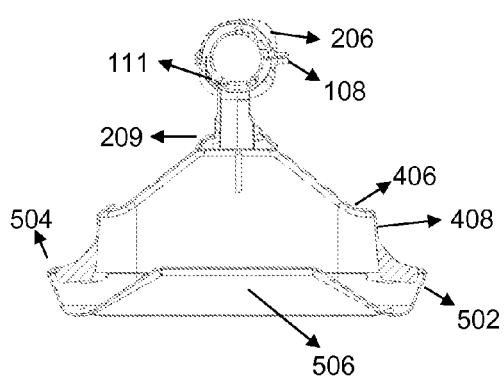
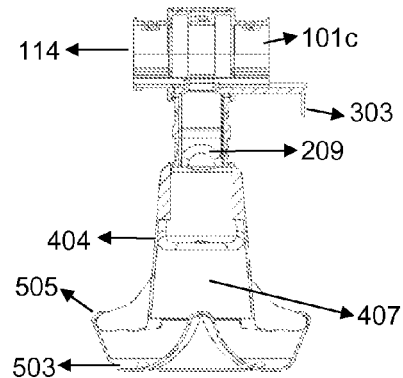
FIG. 24　　　　　　　FIG. 25

POULTRY FEEDER

TECHNICAL FIELD OF THE INVENTION

The present invention refers to a poultry feeder, specifically refers to a feeder for small birds in initial stages of their growth. The poultry feeder presented has the capacity to be connected to an automatic feeding system, being a potential application field, a hi-tech poultry production place, with the objective to be used as a reservoir and feeding source, mainly for consumption by birds being on the floor or inside a cage and that requires continuous feeding. In birds such as chickens, its typical use involves a period of time that goes from the first week of age until the third week of age, having the option to be used in older birds and different avian species.

BACKGROUND OF THE INVENTION

Commercial poultry farming is worldwide an activity of greater relevance, since it is responsible for the poultry production for productive purposes. Generally, it may be classified into two types of production places, depending on their technical degree:—hi-tech production places, dependent on various automated systems and—traditional or non-sophisticated places that depend largely on the man hand.

The hi-tech places are the most world widely used, with 75% of the commercial exploitation worldwide, producing more than fifty billion birds annually to produce meat. The hi-tech production places include an automation in all their needed systems for an intensive production, such as: feeder systems, coupling drinking systems, feeder and drinking suspension systems, air-conditioning systems, among others.

While the traditional or non-sophisticated locals are rudimentary and conventional, using manual equipment such as hanging feeders and bell-type hanging drinking devices, manual energized heaters, manual curtains, all thereof are totally dependent on human supervision at all times for their proper functioning.

Poultry production comprises between four to six stages. The production of birds to produce meat generally ends between the fifth and ninth week of age, depending on the specific type of bird that the market demands. The most important and critical stages of a bird's life are the initiation and growth stages (on which the present invention is focused), which includes the first three weeks of life, being the first two weeks as the most important and representing up to 30% of the bird's life, which is when the newly born birds come out of the incubation location and arrive at the production location where they have to learn to quickly eat and drink, and because of its body and immunological immaturity, there is a need to provide a strict environmental and health control, which, otherwise would result in a significant delay in their development and increased bird mortality.

The most important supply in this industry is the bird food, which is provided in bulk, which represents 75% of the total production cost, being the most important factor to rationing and that any action that is intended to maximize the feeding utilization will result in a greater productive efficiency by increasing the economic benefit to the poultry producer.

The "on-floor feeding system" is the traditional way to feed the chicken in their first few weeks of life which includes supplying food to the floor without any restriction, presenting a number of disadvantages and problems, such as is the high risk of contamination (and therefore the spread of diseases), waste of food, low feed intake, low productive efficiency, and high production costs, impacting the efficiency of the poultry producer. It has been observed that the "on-floor feeding system" is an important factor for the transmission of serious infections to humans, by which it has taken a relevant interest as a public health problem.

In spite of the fact that hi-tech production places have automatic feeding systems, through automatic type feeders, these are not designed to properly feed the birds during their first few weeks of age so they cause a lot of the above-mentioned problems, such as food contamination and low productivity. To improve the effectiveness of the automatic feeders, there are inserted feeding systems in the traditional on-floor systems that involve the use of plastic trays/cardboard, carpets of paper strips r, or simply to supply food to the birds in the first days of life. These traditional auxiliary feeding sources are used only the first seven days of life, because the waste of food increases proportionally with the age of the birds, as well as the food contamination problems, and increased risk of contamination between birds.

They are used in general within the tech farms, two large families of feeders:

The automatic type, that is adjustable, is connected to a common food supply. Dependent on an automatic feeding system, this type corresponds to the feeder of the present invention; and The non-automatic type, not connected feeders, which include plastic trays/cardboard, carpets of paper strips, to the direct floor and cylindrical manual feeders.

The automatic type feeders are usually of rounded shape, although there are feeders of different shapes and sizes, oval, triangular, hexagonal, square and rectangular, but none of rectangular-rounded shape, that is to say, rectangular with rounded ends, as shown by the feeder for the present invention. A common problem is that the automatic feeders occupy a large space inside the production location by which a smaller number of birds per square meter is placed, reducing productivity. In addition, feeders having oval corners or edges, cause a great conflict for the birds at the time of feeding, since birds dispute and fight for the same eating space, thus the food consumption is significantly lower and therefore the production results are not satisfactory.

The plastic/metal/cardboard trays have a generally rounded or rectangular shaped, and a low height, adequate to allow the birds from the first day of age to easily jump and eat within it, leading to pollution, food waste and spread of diseases by allowing the birds to walk and even sleep within the feeder, also taking up space from the other birds to eat.

As in the trays, the existing automatic type feeders have the disadvantage of allowing the birds to introduce themselves into the plate, walk on the food (contaminating and wasting it), and allowing resting or sleeping within the plate.

The state of the art feeders at the end of the flock and leaving the production location without birds, do not have mechanisms to keep over the level of the tubes, as performed by the feeder of the present invention, which makes the washing and disinfecting work difficult.

In the state of the art, there are several documents relating to automatic feeders, and within the components of these feeders, a relevant part is the connection devices between the feeder and the food supply tube to the feeder, the shape of the tray, and the search for a better distribution of birds and food in order to increase the productivity of bird production systems.

There is, for example, the document ES 238,056, which is entitled "Improved Dosing Hopper, for Feeding Birds"

which is a utility model, although it is found in the state of the art of the present invention, the configuration and feeding form of the product to the hopper, differ significantly from those used in the present invention. Also it is known the ES2,117,148 patent, entitled "Device for Feeding Farmyard Poultry". This device has a circular shape and the product feeding is also performed by an upper duct, but not using a system such as the one described in the present invention on the basis of a choke. The patent ES2,172,428, entitled "Feeder for Farmyard Poultry" is of connectable type to a horizontal tubular conduit (4), such as that of the present invention, for the bulk transport of food for poultry and comprises a main vertical tubular body (1), an integral feeding necklace (6), an outer cone (11), an inner cone (14), a distributing vertical tubular body (17) and an integral plate (20) there between, all of them coaxially arranged and adapted so the change in level of the horizontal tubular conduit (4) causes the sliding of the main vertical tubular body (1) with respect to the distributing vertical tubular body (17), producing the downloading of the food in the plate (20) through lateral openings (5, 6, 18) of which are located on the main vertical tubular body (1), the inner cone (14) and the distributing vertical tubular body (17), or alternatively via inferior openings of the distributing vertical tubular body (17). The feeder can be placed in two positions, the feeding and the cleaning. Important considerations to note are the fact that the present invention comprises a valve for the supply of the product toward the feeder, while the '148 patent requires the rising of the horizontal feeding tube, which implies that the feeding is performed at the same time in each feeder regardless of whether it is required or not.

It is also found in the state of the art, the patent ES 2,202,275, which is entitled "Feeder or Feeding Box for Breeding Farmyard Birds in General". To control the amount of food toward the device, this patent includes a cylindrical shutter 106 which has a tab that rotates the shutter to coincide with the feeding tube toward the plate that receives food, a very different action to the one used in the present document.

The patent ES 2,219,583 granted to Rouck, refers to an oval type feeder, the differences on the way to attach the feeder to the feeding tube and the way to distribute the food to the plate are obviously different with regard to the present invention. The outer shape of the plate is similar to the shape of the plate of the present invention, however as will be detailed later, the differences between both configurations are crucial for a better functioning of the feeder of the present invention.

U.S. Pat. No. 7,581,512, mentions the importance of the tray on which the food is dropped and shows tray designs indicating that the best arrangement is the one shown and includes an elongated shape (oval) or in the shape of two circles that intersect (see summary). As specified in this patent '512, and in the rest of the documents, the configuration of the tray that receives the food and the separation system of the birds at the time of eating are important factors for which, through time, is seeking an ideal way to provide an adequate distribution of food from the horizontal tube, a proper distribution of the birds around the feeder so that they do not invade the same or dirty the food inside it, it has also sought a food supply system to the feeder and the feeder raising in order to properly clean the floor where it sits.

There is a need to develop an automatic type feeder attachable that can replace the traditional "on-floor feeding system". The feeder must have enough features to be used under any type of use, such as in production locations where the birds are on the floor, in production locations where the birds in this cage, as "complementary feeder", as "supplementary feeder", or when the poultry feeder is used in a mixed manner, having the ability to achieve a greater efficiency in the feeding and in the productivity of the birds, mainly during the first three weeks of life, but can be used in later stages or other avian species, with the condition that the height thereof is such that it prevents them from entering the feeder.

Complementary Feeder: Meaning is defined as all feeding sources such as: plastic trays, paper strips, independent cylindrical feeders, etc. that are located between the automatic feeders, either below the automatic feeding tube or at the side thereof, so the food assortment is made in an automated manner, or manually, depending on the case.

TECHNICAL PROBLEM TO BE SOLVED

1. To prevent birds in their first three weeks of life entering the feeder, walk, step on, contaminate the food, and/or use it as a site for rest.
2. To feed birds during their first 2 to 3 weeks of age so that they do not interfere with each other, while allowing for a greater number of birds per square meter within the production location.
3. The replacement of supplementary or complementary feeding sources through plastic/cardboard trays or carpet of paper/cardboard strips.
4. Provide a mechanism through which the feeders can be kept in a fixed position, above the level of the feeding tube after the birds pass to higher stages of growth, in order to perform the washing tasks, disinfection, and "feeder storage" in situ.
5. To achieve to evenly distribute to birds around the feeder, at the time of feeding.
6. To increase the productivity of the production location of the farming, avoiding the exiting of clean food going out of the feeder and the entry of contaminants to the food inside the feeder, thus increasing the consumption of food by the bird.

OBJECTIVES OF THE INVENTION

1. Provide a poultry feeder, of the adjustable type to an automatic feeding system, within a hi-tech production place, that prevents the birds from entering into the feeder and stepping on the food within the feeder contaminating it and the bird sleeps within it but that can be fed.
2. Provide a poultry feeder during their first 2 to 3 weeks of age in a uniform manner and that they do not interfere with each other at the time of eating, enabling at the same time a greater number of birds per square meter of farming.
3. Another objective of the invention is to provide a feeder with a mechanism by which can be kept in at least three fixed positions, above the level of the feeding tube after the birds have reached higher growth stages. The feeder may also have the ability to be fixed in two different positions, 130° to 150° and 150°-170° with respect to the horizontal.
4. To increase the productivity of a bird farming, decreasing the mortality of the birds and preventing food waste.
5. A poultry feeder that can be used in birds that are found in both floor and within a cage.
6. A poultry feeder that works as a "complementary feeder" that is defined as a feeder that is placed below the feeding supply lines between the automatic type feeders of the already existing and known; as a "supplementary feeder", which is defined as a feeder that is placed independently to the automatic type feeders of the already existing and known, suspended below their own automatic lines; as a combination of the two previous options, that is to say, both as a "complementary feeder" as well as a "supplementary poultry feeder" and as a sole feeder, which is defined as the only existing feeder within the production location only feeding supply, which is placed under their automatic feeding lines and without any other feeder/plate being present.

7. A poultry feeder with a uniform distribution of food around the entire plate of the feeder, including the sides and the front and the rear ends.

BRIEF DESCRIPTION OF THE INVENTION

The feeder objective of the invention, as shown in FIG. 1, is of the type connected to an existing automatic feeding system, focused on feeding the birds from the first day of life up to 3 weeks or 21 days of age, approximately, although it can be used with older birds and in other avian species provided that the same cannot be introduced, due to its size, in the plate of the feeder. The poultry feeder of the present invention comprises the following elements: a clamp, a holding throat, a shutter, a hopper, and a plate.

The poultry feeder plate has a rectangular shape with side and rear ends rounded, taking up less space within the production location, achieving to place more birds per square meter, thus increasing production.

The feeder allows the birds to a better birds distribution around the same and greater feed area among the birds, avoiding the competition between them and by encouraging the consumption of the food.

The feeder can be used in production locations with leveled floors, uneven floors, or when there is a complementary feeder to any type of automatic feeders of the already existing and known, since it has a slide holding throat that allows it to adapt to any surface and at any height when accompanying the automatic feeders without hampering the operation of both.

The feeder has a sliding shutter used to prevent or allow the passing of food into the feeder from the feeding tube.

BRIEF DESCRIPTION OF THE FIGURES

FIG. 22 is a front elevation perspective view of the shutter taken from its grip;

FIG. 23 shows a side left elevation view of the shutter;

FIG. 24 is a left side plan view in longitudinal section of the poultry feeder, showing the coupling between the clamp, its holder, the distribution hopper and food receiving plate;

FIG. 25 is an upper rear elevation view of the feeder of the invention, in transverse cross-section showing the coupling between the clamp, its holder, hopper and plate;

In the present invention the terms left, right, rear, front, upper and lower are merely auxiliary to the description of the invention and should not be limiting of the position of the poultry feeder or of its orientation. Thus, for example, the front view of the poultry feeder is a mirror image of the rear view and side views are mirror images there between.

DETAILED DESCRIPTION OF THE INVENTION

The poultry feeder of the present invention relates to a device that will be used to store food and be a food dispenser component mainly for birds that are found in floor or in a cage, that need to be continuously feeding, efficiently, distributed, hygienic, and safe, mainly during their initiation period, which extends from the first day of age until the age of twenty-one days, but can be used in adult birds or other avian species.

It has been scientifically proven that a bird during its first three days after birth can pollute and waste more than forty grams of food by effect of defecation, scratching with the legs, beak rake, stepping the food along with the introduction of bed material such as: wheat straw, wood shavings, rice husks, soil, etc. It is very important, to estimate the economic impact of this problem, taking into account that in a hi-tech production place depending on their dimensions, may produce from twenty-five thousand up to sixty thousand birds; and in the case of production of birds in cage, up to one hundred and fifty thousand.

The feeder of the present invention can be placed on any type of floor, whether uneven, leveled, and grated floors, thanks to its rectangular geometry with rounded front and rear ends, takes up less physical space within the hi-tech production place and at the same time provides a greater area of feeding, archiving feeding and producing a greater number of birds per square meter, which will result in a significant higher production of birds and a higher production of meat by bird/food consumed.

Figure 1:
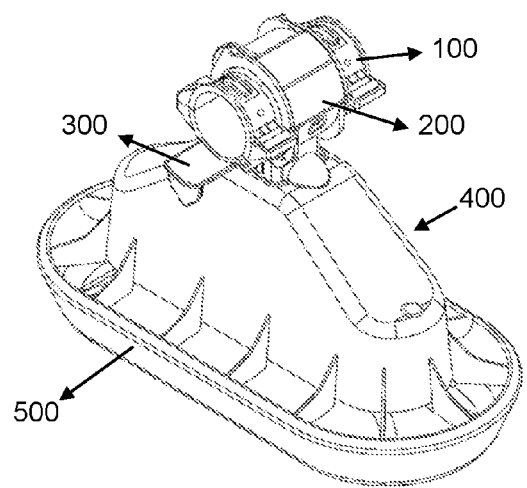
FIG. 1 shows an upper isometric left perspective view of the poultry feeder of the present invention.
Figure 12:
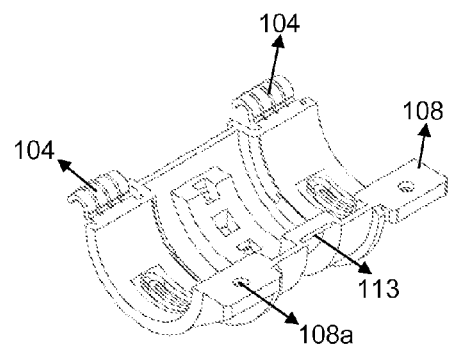
FIG. 12 is a bottom isometric view of the inner part of the upper half of the clamp.
Figure 13:
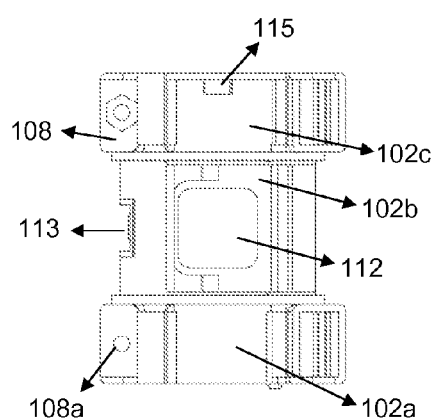
FIG. 13 is a bottom plan view of the external part of the lower half of the clamp.
Figure 14:
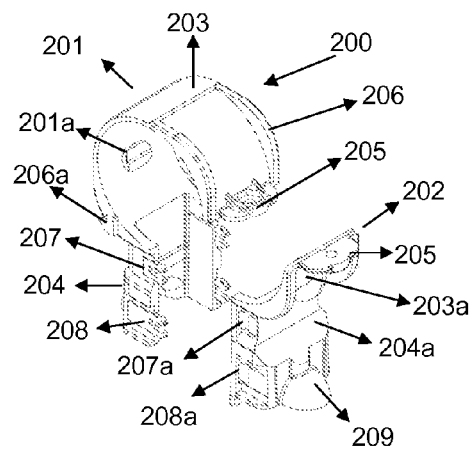
FIG. 14 is a front upper perspective and exploded view of the holding clamp of the clamp.
Figure 15:
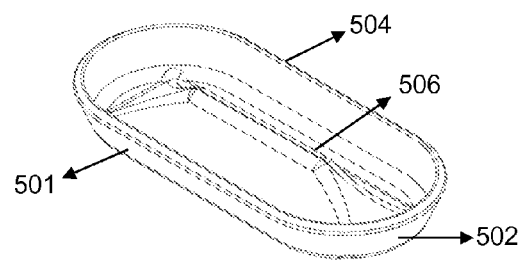
FIG. 15 is an upper perspective view of the plate where the food of the bird is received.
Figure 16:
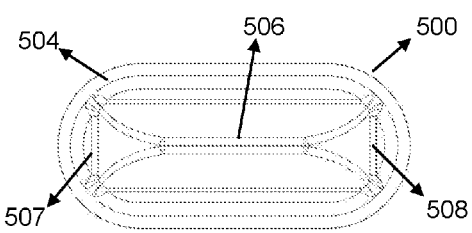
FIG. 16 is a bottom plan view of the plate.
Figure 17:
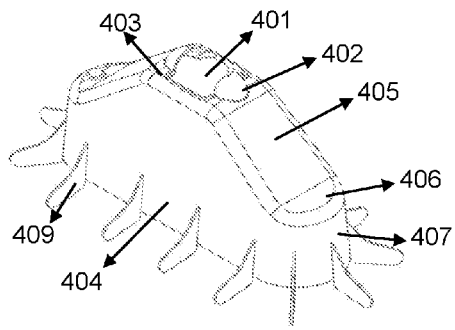
FIG. 17 is a plan view of the food distribution hopper.
Figure 18:
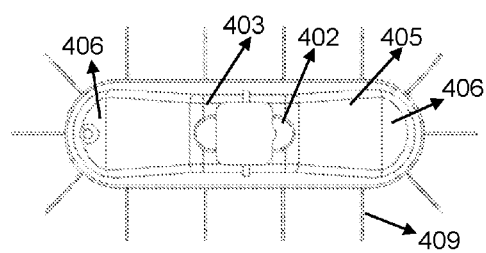
FIG. 18 is a bottom plan view of the food distribution hopper.
Figure 19:
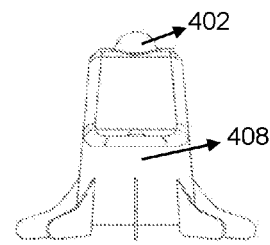
FIG. 19 is a rear elevation view of the hopper in FIG. 17.
Figure 20:
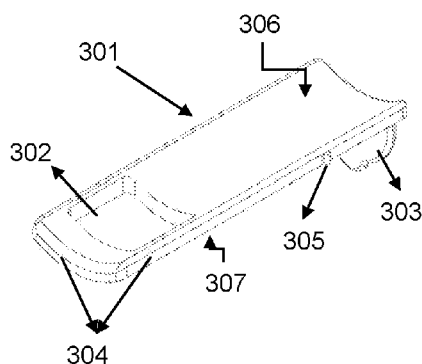
FIG. 20 is a front perspective view of the hollow shutter.
Figure 21:
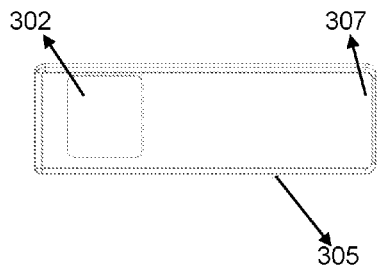
FIG. 21 is a view on the upper floor of the shutter.

The poultry feeder for birds shown in FIG. 1, comprises: a bifurcated clamp (100) shown in detail in FIGS. 6 to 13; a bifurcated holding throat (200) shown in FIG. 14; a shutter (300) shown in detail in FIGS. 20 to 23; a hopper (400)

shown in detail in FIGS. 17-19 and a food receiving plate (500), shown in FIGS. 15 and 16.

The clamp embraces a food supply tube, the holding throat (200) surrounds the clamp, the hopper hangs from the nozzle and the receiving plate hangs from the hopper.

Figure 2:
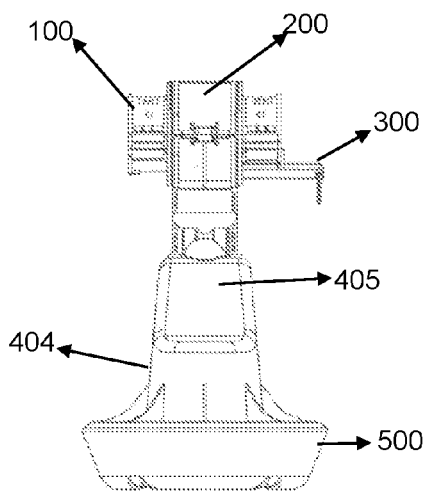
FIG. 2 is a front view of the poultry feeder.
Figure 3:
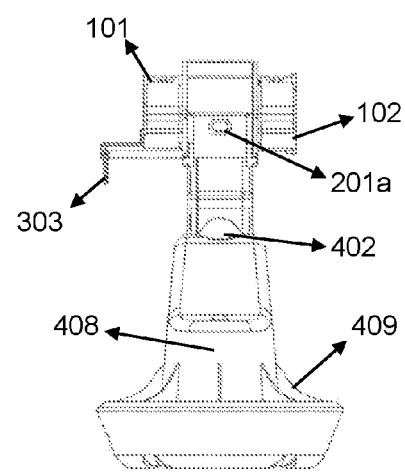
FIG. 3 is a rear view of the poultry feeder.
Figure 4:
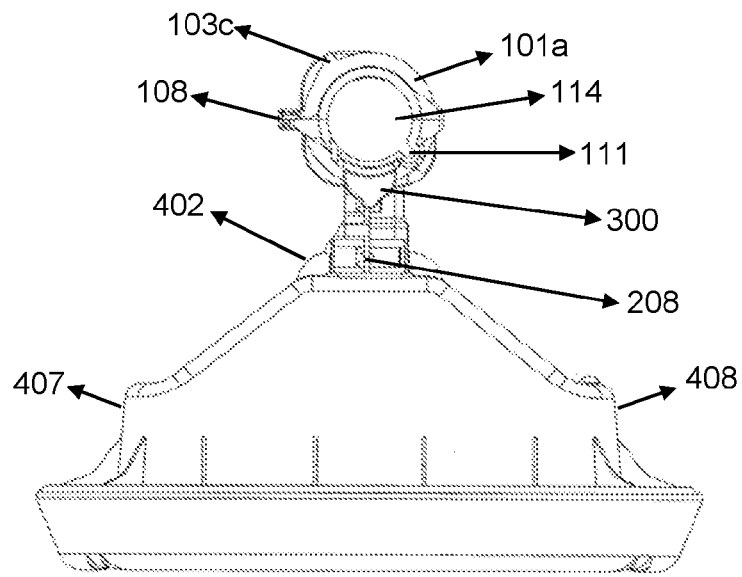
FIG. 4 shows a right side elevation view.
Figure 5:
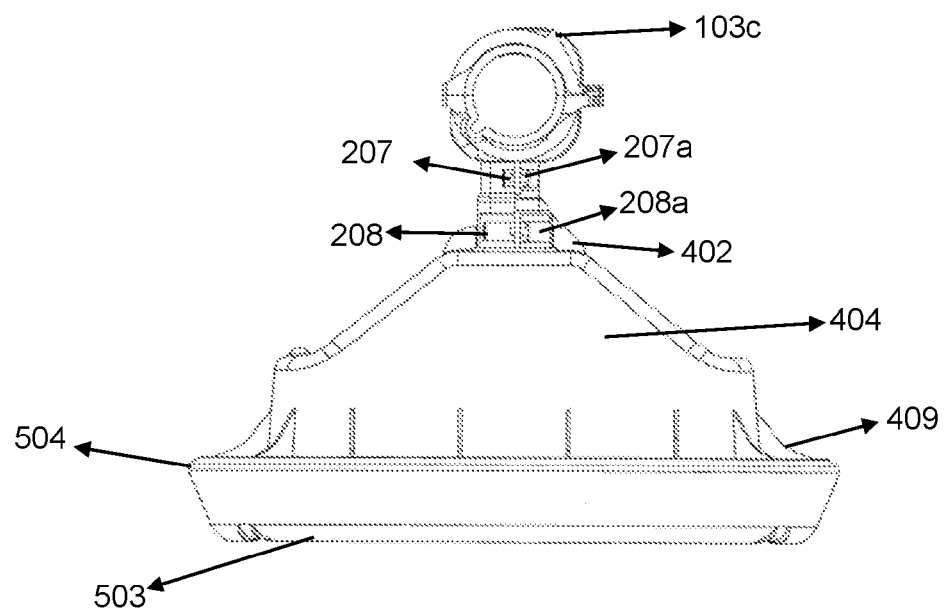
FIG. 5 shows a left side elevation view.
Figure 6:
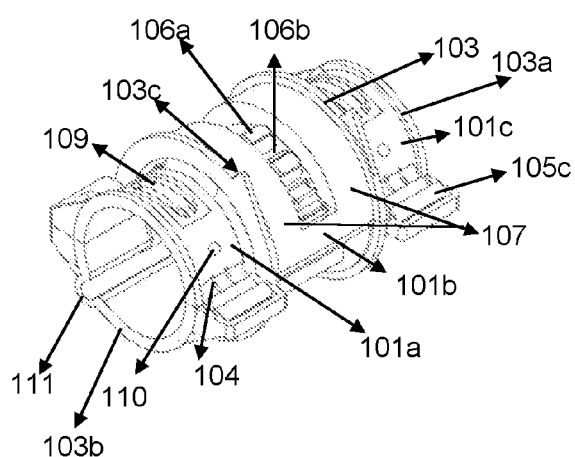
FIG. 6 is a perspective upper front view and left side view of the clamp.
Figure 7:
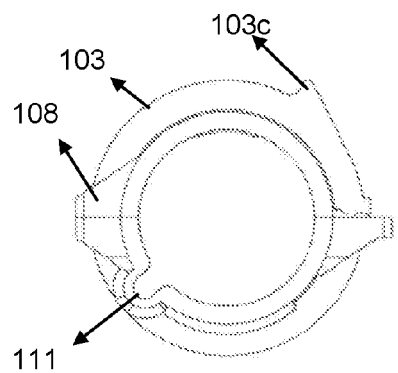
FIG. 7 is a front elevation view of the clamp.
Figure 8:
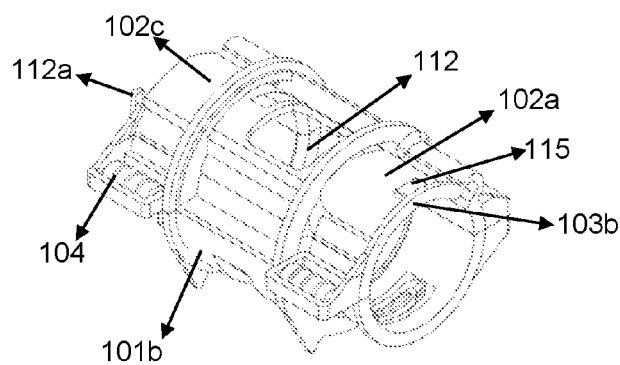
FIG. 8 is a bottom perspective view which shows the rectangular opening through which food passes from the feeding tube.
Figure 9:
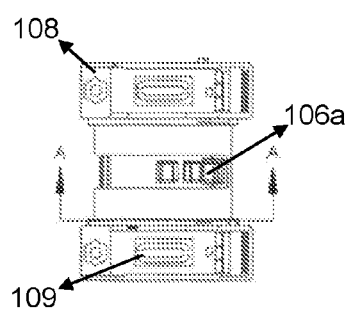
FIG. 9 is an upper elevation view of the clamp.
Figure 10:
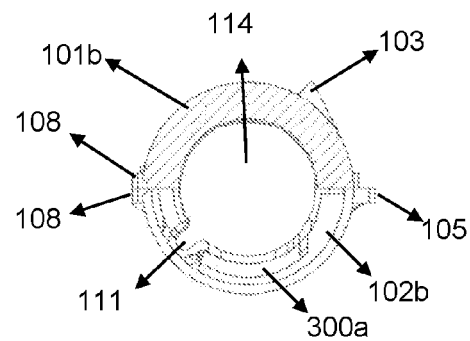
FIG. 10 is a sectional view taken along the line A-A of FIG. 9.

The clamp (100), generally of cylindrical shape, shown in FIGS. 2, 3 and 8 (among others) is formed by two halves substantially symmetrical, semi-cylindrical, upper and lower (101,102 respectively) which work together to embrace the supply tube for bird bulk food. The upper half of the clamp comprises: an upper left lateral section (101a), upper central section (101b) and upper right lateral section (101c); and the lower half of the clamp comprises a lower left lateral section (102a); lower central section (102b), and a lower right lateral section (102c); see FIGS. 6, 8 and 13, for example. The central sections having a higher width and diameter. Flanges (103) that divide the center sections are of larger diameter than the flanges on the sides (103a, 103b). Flanges (103) include a protrusion or stop (103c) which serves as a stop of maximum-security rotation when the feeder must be moved to the rest/washed and disinfected position. In order to slide the shutter (300), flange (103b) has been omitted on the lower side of the clamp, just by the side where the shutter enters.

The upper half (101) (FIG. 3) of the clamp comprises two semicircular tabs (104), and the lower half (102) comprises two protrusions (105) with two grooves each. Each tab (104) is introduced into each first groove (105a) of each protrusion (105), to interlock and form the clamp (100), which is held closed by means of corresponding bolts with nut or similar fastening elements (not shown). The second grooves (105b) are used to allow the complete closure of the clamp receiving the front edge of the tab. Both grooves are separated by means of a pin (105c), which also serves as the pivoting axis for the tab (104).

The upper central section (101b) comprises a central ratchet groove (106) that includes at least two, preferably three, protrusions (106a) as ratchet mode and their corresponding depressions (106b). These ratchets work in conjunction with a protrusion (201a) located in the internal face of the nozzle (200) (see FIG. 14), in order to fix one of the two or three positions to the feeder (100), of storage on-site or cleaning.

The upper central section (101b) further comprises two totally smooth circular surfaces (107) having a diameter greater than the central ratchet groove (106). Both circular surfaces (107) serve as rotating supporting areas for the holding throat (200). The width of the upper central section (101b) corresponds to the total outer width of the parts (201, 202) of the holding throat (200).

The upper half (101) also comprises, in each one of the upper end sections (101a) and (101c), grooves (109), which have a rectangular rounded shape with side openings, these openings are placed inserts of flexible material (not shown), which make contact with the feeding tube and have the function of preventing the clamp from sliding when the feeding tube is the smooth type. Similarly, it includes two drill holes (110) to indicate the position of the clamp.

As mentioned, the present feeder can be used in smooth automatic feeding tubes or with a flange. Tubes with a flange have as a relevant feature to include a side tube which serves as a dragging device of the feeder at the time of turning the tube (if desired). In the present invention, also includes a groove (111) to connect to the side tube and can be used with this type of flange tube, but equally this poultry feeder can be used with smooth tubes.

Figure 11:
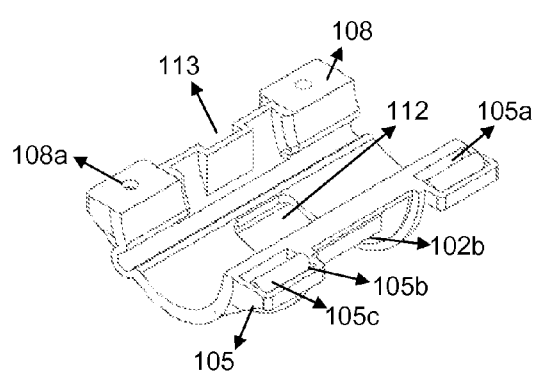
FIG. 11 is an upper and front isometric view of the inner part of the lower half of the clamp.

FIGS. 11 and 12 are views of the internal parts of the clamp, in which the internal configuration is appreciated, in general, following to the external shape, i.e. the protrusions and depressions in the outer part are also observed in the inner part of the clamp.

Returning to FIG. 10, the number (300a) designates the groove where the shutter passes through (300). Through this groove, the shutter longitudinally slides, that includes an opening dimensioned and configured to work in conjunction with the opening (112) of the clamp. FIG. 13 is a bottom plan view of the lower clamp which shows many already described structures. The most relevant issue is the central part where, at the center, there is an opening (112). In this same figure, can be seen the stop and rest (115) of the shutter. Once the shutter (300) travels through all of the inside of the clamp, the same rests on this stop in order to serve it as a support and prevent it from slipping out of the clamp. As has been described, the shutter is used to allow or prevent the passing through of food into the feeder. Another way to prevent the passing through of food to the feeder is turning the feeder so that said opening (112) cannot be used.

In order to hold among them and in a detachable manner the halves (101) and (102), include, besides the tabs (104), protrusions (108). These protrusions comprise, each one, a drilling (108a) so that, through them, a screw can be passed that will be threaded to a nut (not shown). One or both sides of the protrusions (108) comprise, in depression, the shape of the nut in order to reduce the number of tools used for the assembly of the clamp.

In order to allow the passing through of the bulk food from the feeding tube to the plate (500) of the feeder, the lower half of the clamp (102) includes an opening (112) of rectangular, oval or cylindrical shape as required by the design of the feeder (see FIG. 11), although rectangular or square shaped perforations are preferred. The groove (111) runs parallel to the length of the feeding tube and for the entire length of the clamp (100).

Both, the upper half (101) as the lower half (102) of the clamp include, in their respective intermediate sections (101b) and (102b), a depression (113), in the form of rectangular wedge, located at the junction between the two halves (101) and (102), horizontally just between the protrusions (108). This depression (113) allows a fixing screw of the holding throat introduced in the protrusions (205), to be screwed without interference on the part of the outer body of the clamp. The hole (114) formed by the union of the two halves (101) and (102) has the dimensions to adapt to the feeding tube into an adjusted assembly to avoid the free rotation of the clamp.

As it is obvious from the above description, the clamp can be rotated if and only if the feeding tube is turned (in case to be coupled to a tube with a drag line). But this is an inconvenience because it would imply that, if there are more feeders attached to the feeding line, then all should be rotated in the same proportion and in the same direction, which is not desirable in the practice since, as has been indicated, the feeders of the present invention can be feeders that are inserted between birdfeeders for birds in later stages of development. In order to overcome this drawback, the holding throat (200) was developed. The functions of the holding throat t (200) are to hold the clamp, allow and control the passing of the food through toward the plate, and allow the rotation of the poultry feeder individually with respect to the rest of the feeders placed on the feeding tube.

The nozzle (200) is divided into two parts: (201) and (202) of the nozzle. The first part (201) includes an upper portion (203) of generally cylindrical shape and a second lower section (204) of generally rectangular shape, with a transitional intermediate portion between the parts (203) and (204).

The second part (202) also includes an upper portion (203a) of a generally cylindrical portion and a second lower portion (204a) generally rectangular shape, with a transition zone between the portions (203a) and (204a).

The upper portion (203) embraces the central sections (101b) and (102b) of the clamp (100), in sliding form, i.e. grabs the clamp in the central sections but at the same time allows the rotation of the clamp with respect to the nozzle (200). The surface area of the upper portion (203) covers approximately 75%±25% of the surface of the central sections (101b) and (102b) of the clamp although higher and minor percentages can be used, provided that the assembly process of the feeder and its mounting the feeding tube are not affected. The lower portion (203a) embraces the same sections (101b) and (102) but in the rest of the periphery not covered by the upper portion (203).

Both side ends of the upper portion (203) and the lower portion (203a) are limited by protruding flanges (206) of irregular shape in order to prevent that, during the operation, the edges of these protrusions overlap with the edges (103) of the clamp. In this sense, the interaction between these flanges goes beyond only touching to stop in order not to overlap, in effect, the flange (103) of the clamp includes a protrusion (103c) which collides with a stop (206a) located on the side of the protrusion (206), so that when the feeder is rotated around the feeding tube, such rotation is limited in its maximum amplitude by the clash of these two elements.

It has been mentioned that the feeder can be rotated and kept in two positions. This rotation is limited of 130° to 150° and 150° to 170° with respect to the horizontal. To stay in position, a ratchet system has been designed where the teeth are located in the groove (106) of the clamp (100) and are represented by the teeth (106a) and their corresponding depressions (106b).

The rectangular lower portion (204) has two pairs of clips or pins (207) and two pairs of clips or pins (208), entered in the respective grooves (207a) and (208a) located in the lower portion (204a). It is preferred that the assembly (208-208a) is larger than the assembly (207-207a).

This type of assembly between the portions (201) and (202) has been selected because this is how the base of this lower portion (204) may be introduced within a corresponding perforation (401) located in the hopper (400) and assembling the nozzle while holding the two portions (201) and (202) already within the perforation (401).

In order to engage more appropriately, and to allow adequate filling of the food inside the hopper (400), the nozzle (200) comprises, at the lower end, of each of the portions (204) and (204a) a semi-cylindrical protrusion (209) which corresponds in shape and dimensions with a protrusion (402) located in the perforation (401).

In order to allow or prevent the flow of food from the feeding tube to the holding throat (200), to hopper (400) and at the plate of food (500), has been placed a semi-circular shutter (300) (see FIGS. 2-4, 20-23, for example).

The shutter is placed just below the clamp (100) and crosses in a horizontal direction to the holding throat (200), the position of the shutter is such, that once in working position, this is just below the inner floor of the clamp (100) existing only the thickness of the clamp wall, as separation between the feeding tube and this shutter, seeking that this separation is as small as possible, wherever they make contact with each other.

As shown in FIGS. 2 and 3, the longitudinal axis of the shutter (300) is parallel to the longitudinal axis of the clamp (200) and perpendicular to the longitudinal axis of the plate (500).

In FIGS. 20-23, it is shown that the shutter is generally long with a semi-circular cross-section, which radius is such that the upper surface of the same coincide in shape and dimensions to adapt to the external surface of the central bottom clamp, specifically with the opening (112). The shutter comprises a body generally flat and long semicircular (301) with a window (302), a handle (303), side front and upper ridges (304), the stop means (305), an upper surface (306) and a bottom surface (307). The window (302) is located on the end opposite to the longitudinal handle (303), and includes the stop device (305) in one or both side ridges (304). The upper surface (306) is curved and smooth so that it slides smoothly through a groove located in the clamp, the side edges are rounded and match the shape of which groove (300a) located in the transition zone between the semicircular portion (201) and rectangular portion (202) of the clamp (200). Given this feature of free sliding, during the operation or storage, there is a risk that this shutter (300) is not located appropriately and allows the free passing through of food from the opening 112. To prevent this situation, or the stop device (305), is dimensioned so that they stop out with a corresponding protrusion (112a).

When the shutter is in a first "passing through" position, out of the clamp, the shutter (300) stops the run by contact of the stop device (305) with the protrusion (112a) and releases the passing through of food through the opening (112) and, on the contrary, when it is in a second position of "no passing through", towards the inside of the clamp, there is no contact between the means (305) and the protrusion (112a) and prevents the passing through of food. Obviously, there can be intermediate positions with different percentages of food passing through.

The window (302) coincides in dimensions and configuration with the opening (112) of the clamp (100), so as to permit the free passing through or the total or partial closure of the food when desired.

As shown in FIG. 22, the handle (303) is detached from the bottom surface (307) and is biased from its longitudinal axis in order not to interfere with the holding throat (200).

The clamp (100) is firmly secured to the feeding tube (not shown) and to the nozzle (200); the nozzle is fixed fitting well, by weight, the set of parts formed by the hopper (400) and at the plate (500), being, the only means of retaining the throat between the hopper and the parts and food weight when the plate is full.

FIGS. 17-19 show isolated views of the hopper (400) with its perforation (401) and the semi-cylindrical tabs (402) which function is to provide stability to the assembly and form a larger cone of food within the hopper which size and shape help to the uniform distribution of food around the plate (500).

The perforation (401) has the function to receive the external-lower contour of the nozzle (200). The perforation (401) and the protruding tab (402) are located on the upper wall (403) of the hopper, which also includes two parallel side walls (404) perpendicular to the upper surface (403). Also includes a first sloped front wall (405) and a second rear wall with the same inclination as the first. At the end of each one of the sloped walls (405) a small face or horizontal wall (406) continues, that keep the same dimensions of the faces (405) to finally join by the front end to a vertical front wall (407) and a vertical rear wall (408), which join into a single perimeter.

Vertical front walls, the upper wall (403) the front sloped walls (405), the front and rear vertical walls (407, 408), the horizontal walls (406) and the side walls (404) are joined to form the body of the hopper. A series of dividing fins in the form of a rounded bracket (409) are peripherally joined to this body. These fins serve to separate the birds while feeding them and do not allow more than one is located in the same space, even not allowing two birds entering the head in the same space of the feeder.

To ease the installation and orientation of the feeder part, a mark on any of the sides of the hopper may be put, for example in the attached figures, a button has been included on the rear horizontal wall (406). The horizontal walls have the same numeral given that they are symmetrical.

Fins are placed at the bottom of the hopper and its lower edge is located below the bottom edge of the hopper so there is always a tolerance in the gap between the bottom edge of the hopper and the floor of the plate (500) (see FIG. 19 for example).

The joining edges between the different walls of the hopper (400) are rounded in order to prevent the accumulation of food and facilitate the cleaning of the feeder, the same is true with the fins (409).

The upper edges of the fins make contact with the perimeter inner edge of the plate to "charge it" when it is in the working position, i.e. feeding the birds.

The plate (500) comprises (FIG. 15) side walls (501), front and rear walls (502) rounded and a bottom (503). All the walls have an inclination toward the center of the plate, i.e. with an angle less than 90° (acute angle) with respect to the vertical (See FIG. 24 and FIG. 25) and an upper flange (504) which has a sloped tab (505) at an angle higher than 90 degrees (obtuse angle) with respect to the vertical. The objective of this flange is to prevent hurting the birds, the birds throwing food and to prevent birds from jumping up into the poultry feeder. The base has the right height so that birds in their early stages of growth may not jump on the poultry feeder but at the same time are able to feed themselves properly.

The plate bottom comprises an extruded area (506) centered on the plate with a pyramidal and triangular shape in cross-section. The height of this protrusion coincides with the height of the tab (505), all edges (internal and external) of the protrusion and the plate, have a rounded finish and the front walls (507) and rear walls (508) reduce their width toward the upper flange (504) of the extruded area (506), see FIG. 24 and FIG. 25.

Figure 26:
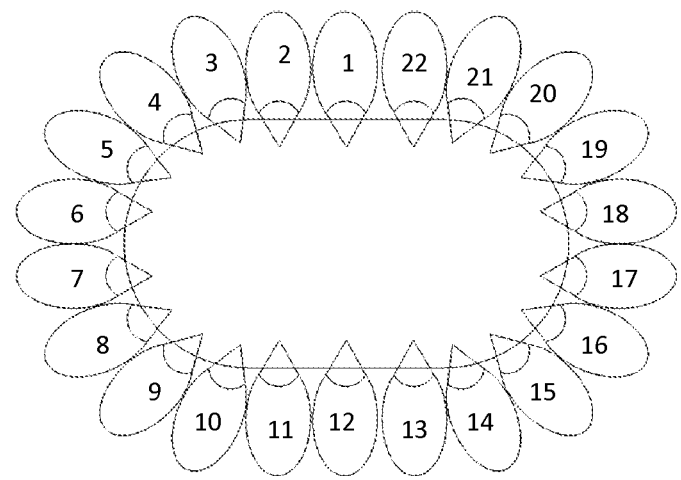
FIG. 26 is an upper plan schematic view of the feeder of the present invention, where the number of birds that can be incorporated thereunto for a given perimeter is illustrated.
Figure 27:
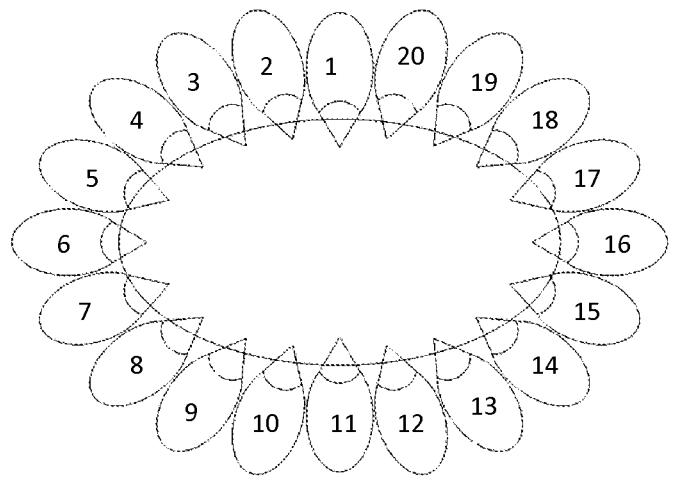
FIG. 27 is an upper plan schematic view of a feeder of the state of the art, where the number of birds that can be incorporated thereunto for the same perimeter that the one in FIG. 26 is illustrated.

Finally, with the FIGS. 26 and 27 a poultry feeder is built to note that the poultry feeder of the present invention surprisingly it was found that is a poultry feeder in oval shape, such as the patent ES 2,219,583, shows a lower efficiency with respect to a rectangular shape with front and rear edges rounded as the present invention. We have enumerated the maximum amount of birds placed immediately after the other and, as can be seen in such figures, the poultry feeder of the present invention may allocate in the same perimeter as the poultry feeder of the state of the art, two more birds by feeder. In addition to this technical advantage, the poultry feeder of the present invention has another technical advantage because it prevents the birds that are located on the rear part of the birds that are fed, they try to "get into" the spaces between bird and bird, because such spaces are reduced due to the same arrangement of birds around the poultry feeder of the present invention. This novel form of poultry feeder improves animal welfare through the improvement of the food distribution system, of the distribution of birds around the poultry feeder, delimiting the spaces of feeding and the habitation space when the birds are not eating, and finally improving the productive efficiency of the birds by reducing aviary production costs which has a ratio of birds per unit area greater than any of the poultry feeders known to date.

For example, for a poultry feeder with an area of 85 cm$^2$ of the oval type as shown in FIG. 27, 20 birds can be placed, while that for the same area using the configuration of the poultry feeder of the present invention, the amount of birds is 22.

In FIG. 26, birds are distributed more evenly, and there are no areas of conflict for the birds to eat, since mainly at the ends the same are distributed ideally, what is known in the state of the art. On the other hand, FIG. 27 of the poultry feeder for the state of the art, it is noted that by the ends, the area is reduced and there is a great conflict in "the corners" involving 4 birds, where only 3 fit, but mainly the two chickens that eat at the ends are the most competing for the same food, since their heads are bumping each other and when one bird eats, the other stops eating because it has no space. This problem reduces the food intake of some birds, which is the most serious issue because the bird is not gaining weight.

In the present invention, the spatial references: front and rear, side, left, right, etc., are relative terms that depend on the position of the poultry feeder and the observer, so that they should not be taken as limiting, but as an example of the description of the invention.

The invention claimed is:

1. A poultry feeder having a rectangular-rounded shape, comprising:
    a cylindrical shaped clamp (100) for securing to a food supply tube and having a left lateral section, a central section and a right lateral section, said clamp being formed by symmetrical and semi-cylindrical upper half and lower half, wherein said upper half of the clamp comprises an upper left lateral section (101a), an upper central section (101b) and an upper right lateral section (101c); and said lower half of the clamp comprises a lower left lateral section (102a); lower central section (102b), and a lower right lateral section (102c);
    the central section of said clamp having a width and a diameter greater than a width and a diameter of the left and right lateral sections; said central section is delimited by two central flanges (103), and the left and right lateral sections comprising an end flange (103a, 103b) respectively, wherein the central flanges (103) have a diameter larger than the diameter of the end flanges, the central flanges (103) further comprising a protrusion (103c) limiting the rotation of the feeder, and wherein the end flange (103b) only extends in the upper right lateral section (101c);
    a bifurcated holding throat (200) holding and surrounding said clamp, wherein the protrusions (103c) of the central flanges (103) abut with a stop (206a) located on said bifurcating holding throat to limit the rotation of said feeder relative to the feeding tube;
    a shutter (300) limiting the food supply;
    a hopper (400) distributing the food supply, said hopper being coupled to and extending from said holding throat (200); and
    a food receiving plate (500) coupled to said hopper (400).

2. The poultry feeder according to claim 1, wherein the upper half (101) comprises two semicircular tabs (104) and the lower half (102) comprises two mating protrusions (105) each having a first groove (105a), a second groove (105b) and a pin (105c) separating said grooves, wherein said pin acts as a pivoting axis so that each tab (104) is inserted into the first groove (105*a*) of each protrusion (105) and pivots around said pin so that a front edge of the tab is received at said second groove (105*b*) allowing complete assembly and closure of the clamp (100), said clamp is maintained closed by means of fixing elements;

the upper central section further comprises a central ratchet groove (106) having a plurality of protrusions (106*a*) and corresponding depressions (106*b*) defining a plurality of positions, said central ratchet groove collaborating with a protrusion (201*a*) located on an inner surface of the holding throat (200) so as to fix the poultry feeder in one of said plurality of positions.

3. The poultry feeder according to claim 2, wherein the upper central section (101*b*) further comprises two smooth circular surfaces (107) having a diameter greater than the diameter of the central ratchet groove (106), said circular surfaces (107) acting as support areas for turning the holding throat (200), the width of the upper central section (101*b*) corresponds to the total width of the holding throat (200); the upper left (101*a*) and upper right (101*c*) sections further comprise a groove (109) having gaps including inserts configured to contact the feeding tube for maintaining the clamp fixed on the feeding tube; said upper left (101*a*) and upper right (101*c*) sections further include holes (110) to indicate the position of the clamp; and wherein the lower half comprises an inner groove (111) configured to receive a flange of a feeding tube.

4. The poultry feeder according to claim 1, wherein the lower central section includes an opening (112) and a groove (300*a*) configured to receive the shutter (300) to selectively block and unblock said opening (112) allowing or preventing the passage of food from a feeding tube, the left lateral section (102*a*) including a stop and rest element (115) adjacent to the end flange (103*b*) for receiving the shutter (300); said clamp further including two protrusions (108), each having a perforation (108*a*) configured to receive fixing means.

5. The poultry feeder according to claim 4, wherein the opening (112) has a shape corresponding to the shape of a window (302) provided on the shutter (300); the upper central (101*b*) and lower central (102*b*) sections of the clamp including a depression (113) having a rectangular wedge shape, located at the junction of the upper (101) and lower (102) halves and longitudinally positioned between the protrusions (108), wherein an inner hole (114) formed by the connection of the upper and lower halves is sized to surround a feeding tube so that the clamp is prevented from turning freely.

6. The poultry feeder according to claim 5, wherein the shutter (300) is placed into said groove (300*a*) below an inner surface of the clamp (100), so that in operation only the thickness of the clamp wall separates said feeding tube and said shutter; wherein the longitudinal axis of the shutter (300) is parallel to the longitudinal axis of the clamp (100) and perpendicular to the plate (500); wherein the shutter has a semicircular cross-section corresponding in shape and dimensions to said groove (300*a*) and a concave and smooth upper surface; said shutter further comprising the window (302), a handle (303) opposite to said window, a lateral stop means (305) limiting the movement of said shutter; wherein the shutter (300) unblocks the opening (112) and allows the passage of food from the feeding tube when the shutter is in a first position towards the outside of said clamp, and the shutter (300) blocks the opening (112) preventing the passage of food from the feeding tube when the shutter is in a second position towards the inside of said clamp; said handle (303) is positioned at an end of said shutter (300) so as to not interfere with the throat (200).

7. The poultry feeder according to claim 1, wherein the holding throat (200) comprises:

a first throat part (201) including an upper portion (203) having a substantially cylindrical shape and a lower portion (204) having a substantially rectangular shape, said upper (203) and lower (204) portions are joined by a transitional intermediate portion; and a second throat part (202) including an upper portion (203*a*) which is substantially semi cylindrical and a lower portion (204*a*) having a substantially rectangular shape, wherein the upper portion (203) of the first throat part (201) surrounds the central section of the clamp (100 allowing sliding rotation of the clamp with respect to the holding throat (200); said upper portion (203) of the first throat part is configured to cover more surface area of the central section of the clamp than the upper portion (203*a*) of the second throat part, both ends of the upper portion (203) of the first throat part and the upper portion (203*a*) of the second throat part are limited by protruding flanges (206) having a shape provided to prevent said protruding flanges (206) to overlap the central flanges (103) of the clamp, wherein the stop (206*a*) is located opposite to said protrusion (206).

8. The poultry feeder according to claim 7, wherein the lower portion (204) of the first throat part has a first pair of clips (207) and a second pair of clips (208) configured to be inserted into corresponding first groove (207*a*) and second groove (208*a*) located in the lower portion (204*a*) of the second throat part, respectively; the size of the assembly formed by the second pair of clips (208) and the second groove (208*a*) is larger than the size of the assembly formed by the first pair of clips (207) and the first groove (207*a*), wherein the feeder can rotate and be held in any position within two ranges from 130° to 150° and 150° to 170°.

9. The poultry feeder according to claim 7, wherein the lower portion (204) of the first throat part and the lower portion (204*a*) of the second throat part further comprise a semi-cylindrical protrusion (209) located at the lower end of each lower portion corresponding in shape and dimensions with semi-cylindrical protrusions (402) located adjacent to a perforation (401) of the hopper (400).

10. The poultry feeder according to claim 1, wherein the hopper (400) comprises a perforation (401) and semi-cylindrical protrusions (402) providing stability to the assembly of the holding throat (200) and the hopper (400); said perforation (401) and the semi-cylindrical protrusions (402) are located on an upper wall (403) of the hopper that is joined to two parallel side walls (404) perpendicular to said upper wall (403) and to front and rear sloped walls (405), wherein each of the front and rear sloped walls (405) comprises at its lower end a small horizontal wall (406) which is joined to a front vertical wall (407) and a rear vertical wall (408), respectively, so that said parallel side walls (404), said upper wall (403), said front and rear sloped walls (405), and said front and rear vertical walls (407, 408) integrally form a body of the hopper.

11. The poultry feeder according to claim 10, wherein the hopper further includes a plurality of peripheral separating fins in the form of a rounded brackets (409) provided to separate the birds while feeding and to prevent that more than one bird occupies the same space in the feeder; said fins are placed at a lower end of the hopper so that a lower edge of said fins is located below the lower edge of the hopper providing a gap between the lower edge of the hopper and a floor of the plate (500), wherein the lower edges of the fins are in contact with an internal peripheral tab (505) of the plate allowing to fill said plate with food.

12. The poultry feeder according to claim 1, wherein the plate (500) includes side walls (501), rounded front and rear walls (502) and a bottom (503), wherein all the walls have an inclination of less than 90° towards the center of the plate, and an upper flange (504) having a tab (505) sloped at an angle greater than 90°; said plate (500) has a height selected to prevent the birds in their early stages of growth jumping onto the poultry feeder while allowing at the same time to feed.

13. The poultry feeder according to claim 12, wherein the bottom (503) of the plate (500) comprises a centered extruded area (506) extending along said bottom (503) and having a triangular cross-section; the height of said extruded area (506) coincides with the height of the internal sloped tab (505), wherein the edges of the plate have a rounded shape.

* * * * *